United States Patent
Coskun (10) Patent No.: US 11,035,394 B2
(45) Date of Patent: Jun. 15, 2021

(54) CONNECTION SYSTEM

(71) Applicant: Kenan Coskun, Kilis (TR)

(72) Inventor: Kenan Coskun, Kilis (TR)

( * ) Notice: Subject to any disclaimer, the term of this patent is extended or adjusted under 35 U.S.C. 154(b) by 323 days.

(21) Appl. No.: 16/322,487

(22) PCT Filed: Aug. 1, 2016

(86) PCT No.: PCT/TR2016/050253
§ 371 (c)(1),
(2) Date: Feb. 1, 2019

(87) PCT Pub. No.: WO2018/026332
PCT Pub. Date: Feb. 8, 2018

(65) Prior Publication Data
US 2020/0378417 A1    Dec. 3, 2020

(51) Int. Cl.
*F16B 5/02* (2006.01)
*F16B 41/00* (2006.01)

(52) U.S. Cl.
CPC ............. *F16B 5/02* (2013.01); *F16B 41/002* (2013.01)

(58) Field of Classification Search
CPC ........ F16B 5/02; F16B 23/003; F16B 41/002; F16B 43/001
USPC .......... 411/337, 356, 366.1, 370, 371.1, 383, 411/403
See application file for complete search history.

(56) References Cited

U.S. PATENT DOCUMENTS

| | | |
|---|---|---|
| 1,343,667 A | 6/1920 | Evensen |
| 2,398,220 A | 4/1946 | Gelpcke |
| 2,632,354 A | 3/1953 | Black |
| 2,905,045 A | 9/1959 | Vance |
| 2,915,934 A | 12/1959 | La Torre |
| 3,099,470 A * | 7/1963 | Zumbusch ............. F16B 5/025 403/408.1 |
| 3,298,725 A * | 1/1967 | Boteler ................... F16B 19/02 403/282 |
| 3,330,177 A * | 7/1967 | Oliver ................... B25B 13/065 411/424 |
| 3,750,525 A | 8/1973 | Waters et al. |
| 3,835,525 A * | 9/1974 | King, Jr. ................. F16B 19/02 29/412 |
| 4,048,898 A * | 9/1977 | Salter ....................... F16B 5/02 411/44 |

(Continued)

FOREIGN PATENT DOCUMENTS

| | | |
|---|---|---|
| DE | 202009006738 U1 | 9/2009 |
| WO | 2011138306 A1 | 11/2011 |

*Primary Examiner* — Roberta S Delisle
(74) *Attorney, Agent, or Firm* — Bayramoglu Law Offices LLC (57) ABSTRACT

A connection system including a connection hole inserted in form of a circular hole on the part to be connected, a cylindrical hole bushing engages into the connection hole and has a screw hole thereon vertical to the surface of the part to which it is placed, a bolt is placed on the hole bushing such that the head part remains on the lower surface of the part or inside the part, a nut attached at the bolt end extending outwards the part, a washer formed of a circular base is placed between the head part and the hole bushing, a rib extends vertically over the base and is folded by compressing between the head part and the hole bushing, and prevents the head part from passing through the connection hole, and enabling two or more parts to be connected.

10 Claims, 13 Drawing Sheets

(56) References Cited

U.S. PATENT DOCUMENTS

| | | | |
|---|---|---|---|
| 9,551,373 B2* | 1/2017 | Tanner | B64D 45/02 |
| 9,714,676 B2* | 7/2017 | Achtner | F16B 43/00 |
| 10,711,814 B2* | 7/2020 | Simpson | F16B 4/004 |
| 2005/0201846 A1* | 9/2005 | Santamaria | F16B 5/0241 |
| | | | 411/108 |
| 2010/0296895 A1* | 11/2010 | Cassatt | F16B 19/1054 |
| | | | 411/337 |
| 2015/0192164 A1 | 7/2015 | Hsu | |
| 2015/0377279 A1* | 12/2015 | Tanner | B64D 45/02 |
| | | | 29/525.02 |
| 2016/0040709 A1* | 2/2016 | Achtner | F16B 19/02 |
| | | | 411/337 |

* cited by examiner

CONNECTION SYSTEM

CROSS REFERENCE TO THE RELATED APPLICATIONS

This application is the national phase entry of International Application PCT/TR2016/050253, filed on Aug. 1, 2016, the entire content of which is incorporated herein by reference.

TECHNICAL FIELD

The present invention relates to a connection system which enables to mount connecting elements including bolts and the like especially on the surfaces that are not accessible from the rear and inner parts.

BACKGROUND

There are connecting elements especially used in connecting parts and forming mounting connections on the surfaces in the current technique. The most commonly used connecting elements in the current market are screws and bolts. The bolts are in form of screws with large heads tightened by attaching nut at the rear ends after being inserted through the previously prepared holes of the parts required to be connected to each other. Bolt head and nut apply pressure with a rotary movement on a surface and they are mounted on the part or parts to which they are connected. While mounting the bolt, after attaching the bolt head inside the hole by rotating, the nut part is attached with turning movement from the rear part of the hole and thus the bolt mounting process is completed. However, when the rear surface of the hole is not accessible (closed profile, concrete, wood, machine parts or surfaces, etc.), the nut cannot be attached to the rear part of the bolt. In order to solve this problem, alternative solutions such as dowel mechanisms, center connection and welding are formed. However, these solutions do not provide an appropriate connection for attaching two parts. Connections especially made with welding are not preferred since it is both dangerous and difficult in terms of human health, occupational health and safety.

U.S. Pat. No. 3,750,525A, an application known in the state of the art, discloses a collapsible insert device which is placed on a surface in order to form bolt slot on the surfaces and wherein a portion of its part under the surface can be folded by turning the bolt.

U.S. Pat. No. 2,398,220A, an application known in the state of the art, discloses a bolt fixing system which enables to fix the bolts on surfaces without using nuts. In the system, there is a handle mechanism on the screw slot and the handles are opened upon the bolt passes through the screw slot and apply pressure on the surface from the rear surface.

U.S. Pat. No. 2,915,934, an application known in the state of the art, discloses blind fastener bolts, and this invention deals with the problem of locking the fastener when it has been set up tightly against the work. Collar (7) is metal which is easily formed by external force to hold parts in driving operation. Collar (7) has a female thread to connect with bolt and sleeve has a pointed end to create end of head (7'). End of head (7') is created by the deformation of collar (7) and this kind of deformation causes fatigue on collar (7). Due to the deformation of collar (7) causes stress concentration. furthermore, material cost of collar (7) is more and the labor cost of collar (7) joints is more.

International Patent document no WO2011138306, an application known in the state of the art, discloses blind fastener bolts, resilient member (21) shape change materiel by the external force. This application not provide a connection system which enables the connecting elements to be easily attached on the surfaces the rear surfaces of which are not accessible.

SUMMARY

The objective of the present invention is to provide a connection system which enables the mounting of connecting element used in metal, concrete, wood, glass, plastic, pipe, profile connections and connection of parts.

Another objective of the present invention is to provide a connection system which enables the connecting elements to be easily attached on the surfaces the rear surfaces of which are not accessible.

A further objective of the present invention is to provide a connection system which enables the connecting elements comprising screw threads (bolt, screw, etc.) to be attached on the areas that cannot be accessed from the back or inside (pipe, profile, concrete, wood, etc.) by accelerating with a mechanism attached to a drill, and which functions as rivet and dowel.

The objective of the present invention is to provide a connection system which is inserted into the hole made on the surface and comprised of a hole bushing, connecting element, nut and washer in the same size as the hole, and which provides attachment to the surface with opening movement of the washer.

Another objective of the present invention is to provide a connection system which enables the bolt to be fixed with rotary movement with the use of bolt with stay bolt channel hole.

A further objective of the present invention is to provide a connection system which comprises a turning mechanism that enables the connecting element to remain fixed and the nut to be tightened after hole bushing, connecting element, nut and washer are placed on the surface.

BRIEF DESCRIPTION OF THE DRAWINGS

A connection system developed to fulfill the objective of the present invention is illustrated in the accompanying figures wherein.

The components given in the figures are individually numbered where the numbers refer to the following.

1. Connection system
2. Hole bushing
   21. Screw hole
   22. Horizontal channel
   23. Pin
3. Bolt
   31. Head part
      311. Protrusion surface
   32. Allen slot
4. Nut
5. Washer
   51, Base
   52. Rib
   53. Recess
6. Spacer
7. First turning mechanism
   71, Primary body
   72. Primary holder
   73. Allen tip
   74. Primary spring
8. Second turning mechanism
   81. Secondary body
   82. Plate
   83. First gear
   84. Second gear
   85. Allen rod
   86. Secondary holder
   87. Secondary head
P. Part
D. Connection hole
A. Lower surface
B. Outer surface
M. Drill

DETAILED DESCRIPTION OF THE EMBODIMENTS

The connection system, which enables two or more parts (P) having connection hole (D) thereon to be connected or to form connection on the connection hole (D) on the surface of a part (P), essentially comprises
  at least one cylindrical hole bushing (2) which passes into the connection hole (D) and which has at least one screw hole (21) vertical to the surface of the part (P) on which it is placed,
  at least one bolt (3) which is placed on the hole bushing (2) such that its head part (31) will remain on the lower surface (A) of the part (P) or inside the part (P), and the head part (31) of which is equal to the diameter of the hole bushing (2) or in smaller size,
  at least one allen slot (32) which is in form of allen hole at the end of the bolt where the head part (31) is not present,
  at least one nut (4) which is attached at the bolt end extending towards outside the part (P) and which fixes the bolt on the hole bushing (2) with rotary movement,
  a circular base (51) which is parallel to the surface of the hole bushing (2) and which is equal to the hole bushing (2) diameter or in smaller size,
  at least one washer (5) which extends vertically on the base (51), which is comprised of at least one rib (52) collapsing by being compressed between the head part (31) and the hole bushing (2) upon tightening the nut (4) and the bolt remaining fixed or the nut (4) remaining fixed and turning the bolt, which prevents the head part (31) from passing through the connection hole (D) upon the ribs (52) opening to a larger width than the diameter of the connection hole (D) in horizontal direction, that are placed such that they will be between the head part (31) and the hole bushing (2),
  at least one spacer (6) which is placed on the bolt such that it will be between the nut (4) and the hole bushing (2), and which prevents the nut (4) from passing through the connection hole (D).

Figure 1:
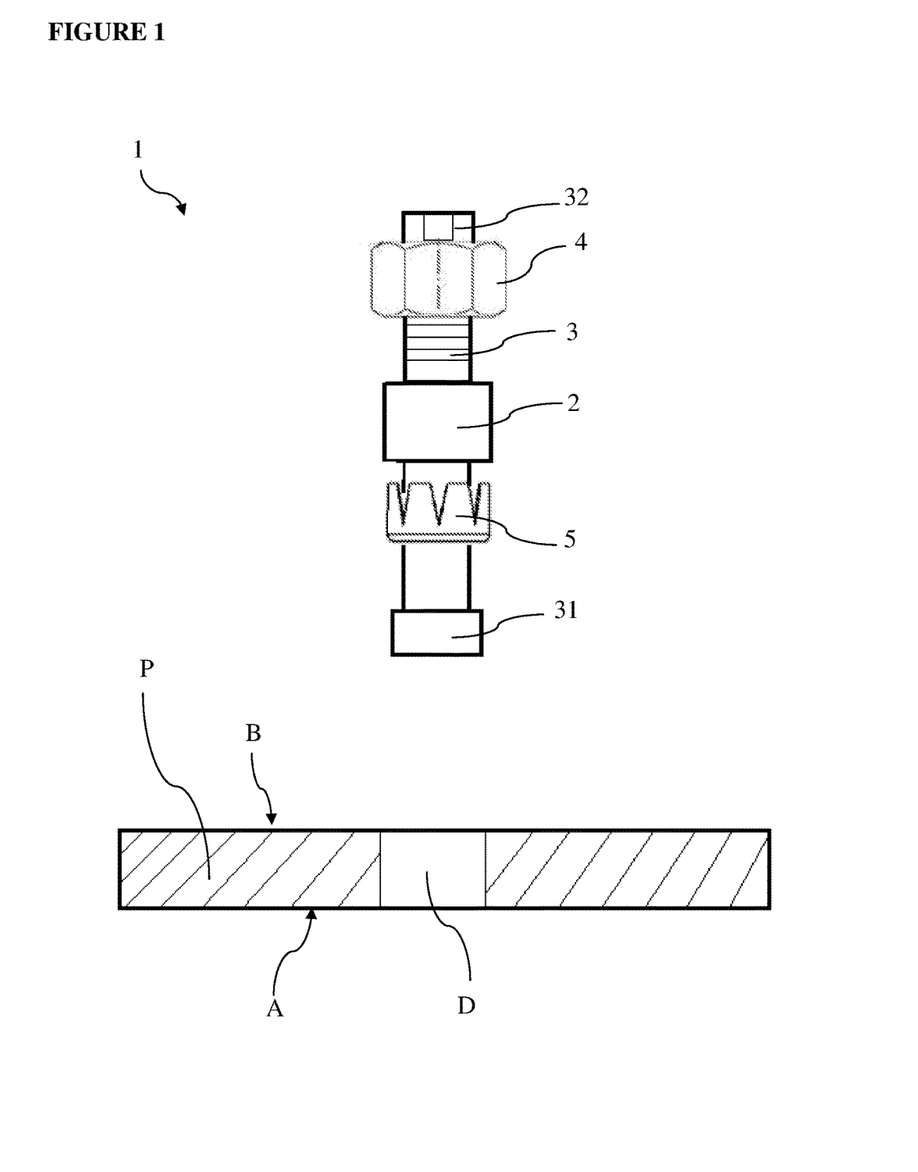
FIG. 1 is the side view of the inventive connection system before it is attached on the part.
Figure 2:
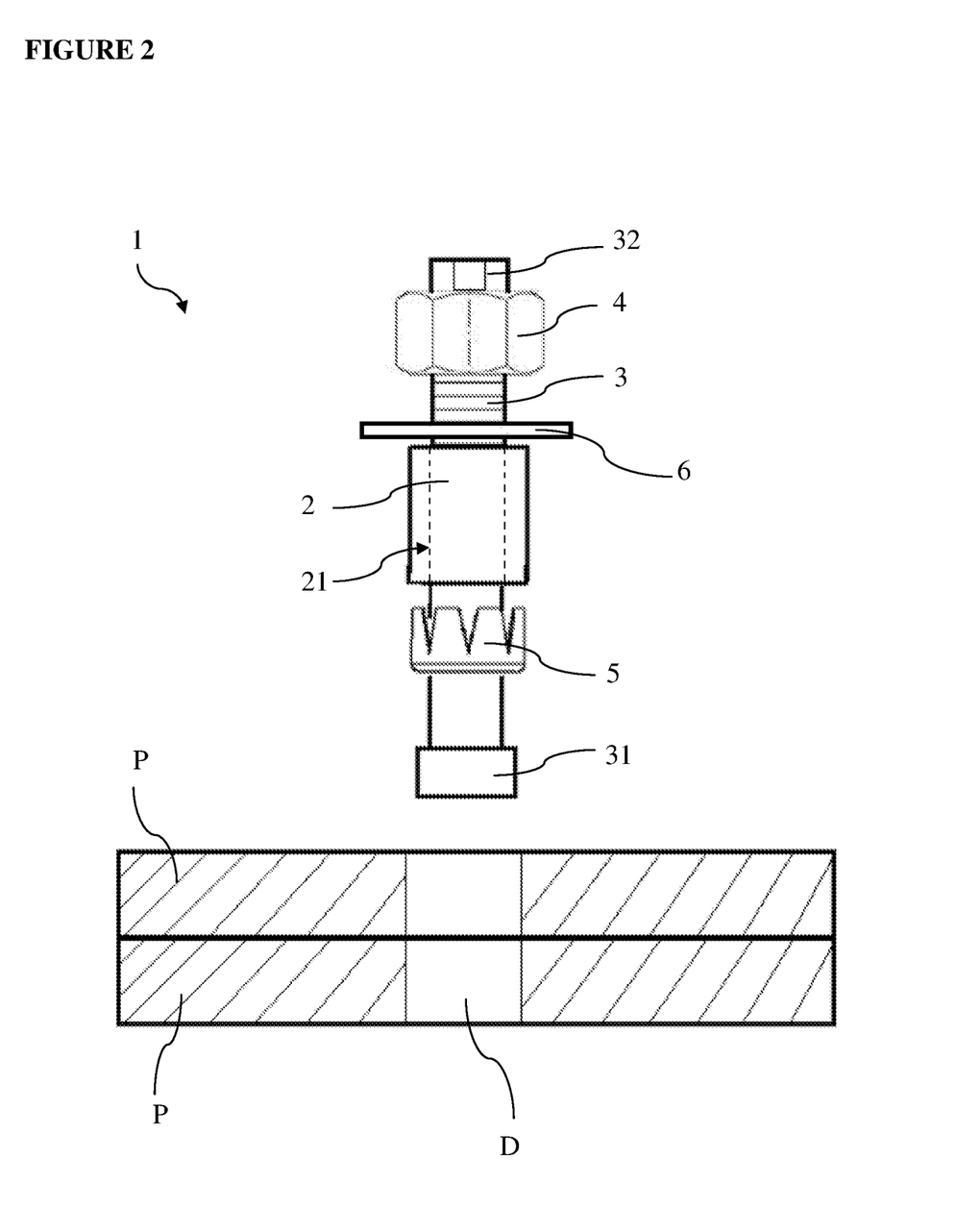
FIG. 2 is the side view of the inventive connection system before it is attached on two parts.
Figure 3:
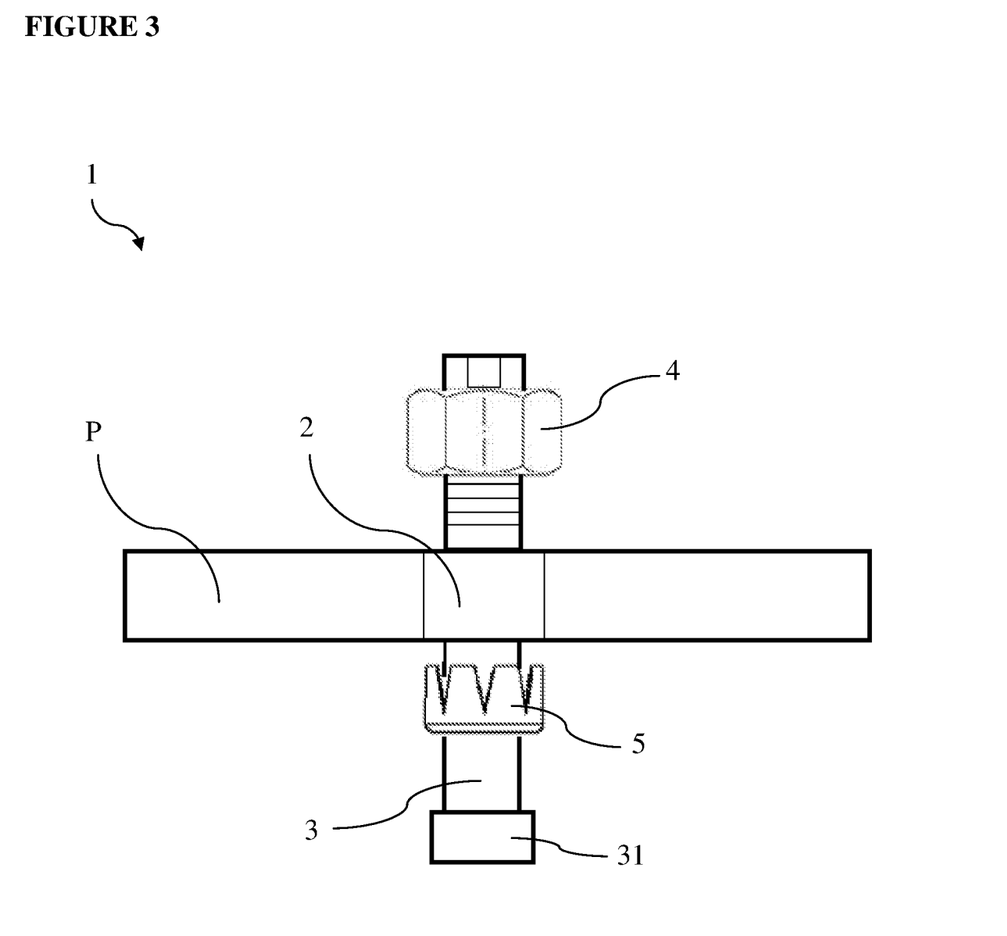
FIG. 3 is the side view of the inventive connection system when it is attached on the part.
Figure 4:
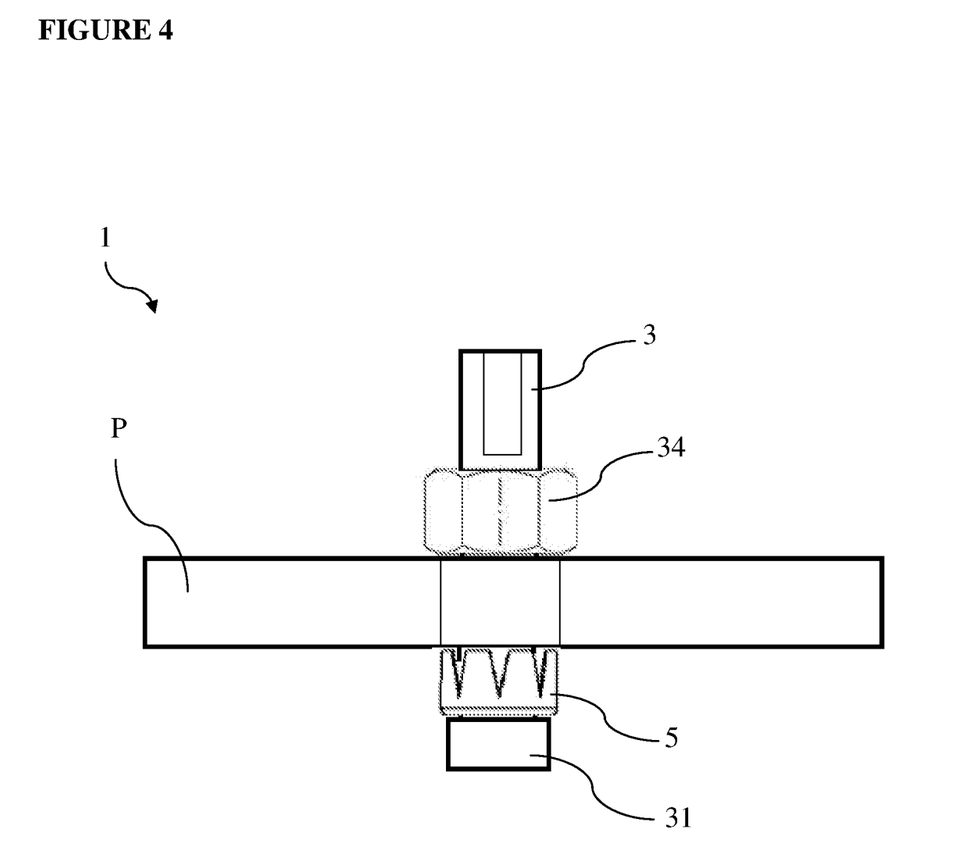
FIG. 4 is the side view of the inventive connection system when it is attached on the part and it is started to tighten the washer.
Figure 5:
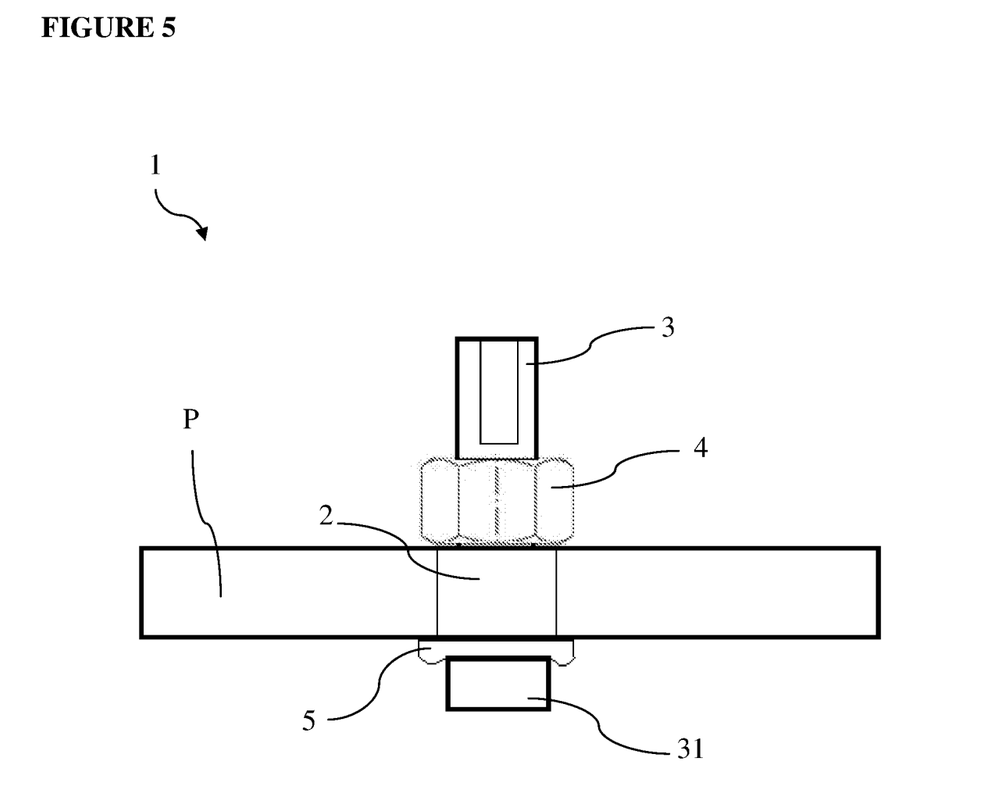
FIG. 5 is the side view of the inventive connection system when it is attached on the part and the washer is opened.
Figure 6:
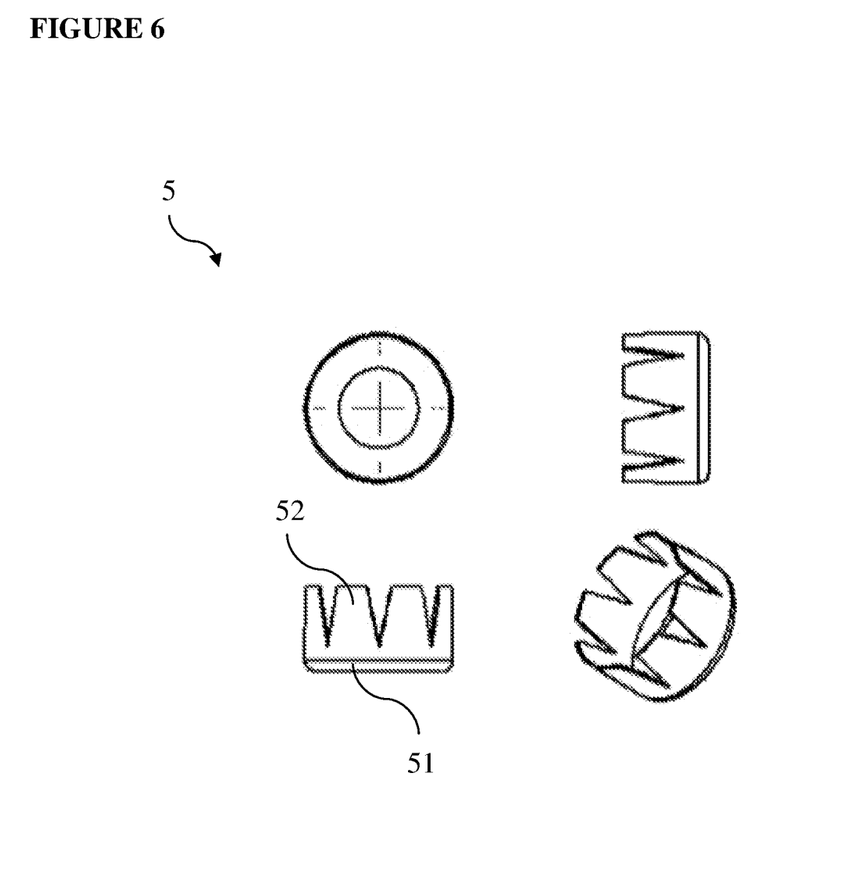
FIG. 6 is the views of the washer on the inventive connection system from different angles.

The inventive connection system (1) fixes the bolt on the part (P) or the parts (P) by placing the bolt, nut (4) and the washer (5) on the hole bushing (2), placing the hole bushing (2) inside the connection hole (D) on the part (5) which is desired to be connected, and performing a locking process with opening movement of the washer (5). When two or more parts (P) are desired to be connected, the connection holes (I)) on the parts (P) are aligned, and the hole bushing (2) is passed through both connection holes (D).

In the inventive connection system (1), the part (P) on which the bolt is desired to be placed has an upper surface (B) which can be interfered by the user, and a lower surface (A) which cannot be accessed by the user and which is in opposite side of the upper surface (B) of the part (P). The connection hole (D) is inserted before in form of a hole from the upper surface (B) of the part (p) towards its lower surface (A). The hole bushing (2) is preferably in same thickness with the part (P) wall thickness or has similar sizes. For example, the wall thickness of the part (P) is 3 cm, while the hole bushing (2) is 3 cm or 2.95 cm. Bolt, washer (5) and the nut (4) are placed on the hole bushing (2), and the hole bushing (2) is arranged such that it will interference fit into the connection hole (D) and the head part (31) and the washer (5) will remain on the lower surface (A) of the part (P) or inside the part (P). Upon the nut (4) being held fixed and an allen head performing rotary movement by passing into an allen slot (32) or holding the bolt fixed and rotating the nut (4), the head part (31) of the bolt moves towards the hole bushing (2) and the head part (31) of the bolt applies force in vertical direction on the ribs (52) of the washer (5). The ribs (52) compressed by the head part (31) of the bolt perform bending movement and open in horizontal direction, and thus it is enabled that the diameter of the washer (5) reaches larger values than the diameter of the hole bushing (2). Since the washer (5) reaches a greater value than the diameter of the connection hole (D), it fixes the head part (31) of the bolt on the lower surface (A) of the part (P), and the nut (4) performs locking through the upper surface (B) of the part (P). In this way, the bolt (P) is fixed on the part (P) from its upper surface (B) and its lower surface (A).

Figure 7:
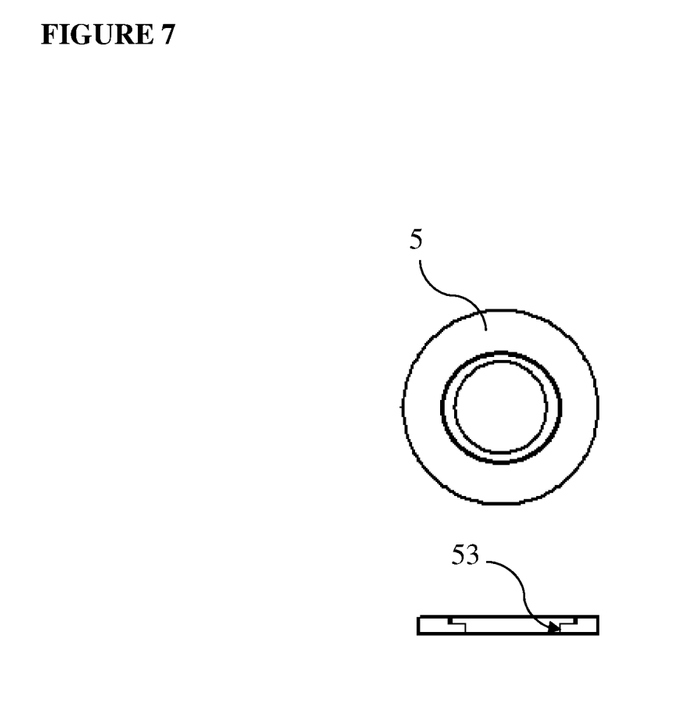
FIG. 7 is the side view of an embodiment of the washer on the inventive connection system.
Figure 8:
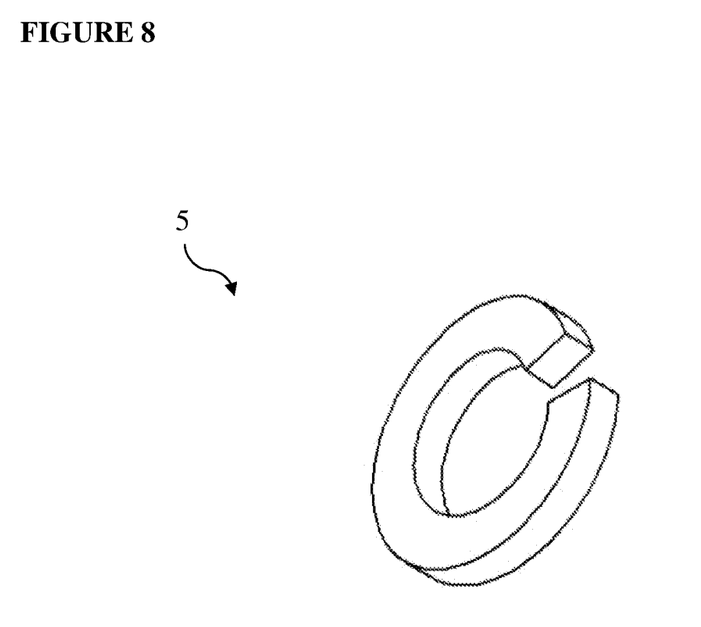
FIG. 8 is the perspective view of an embodiment of the washer on the inventive connection system.
Figure 9:
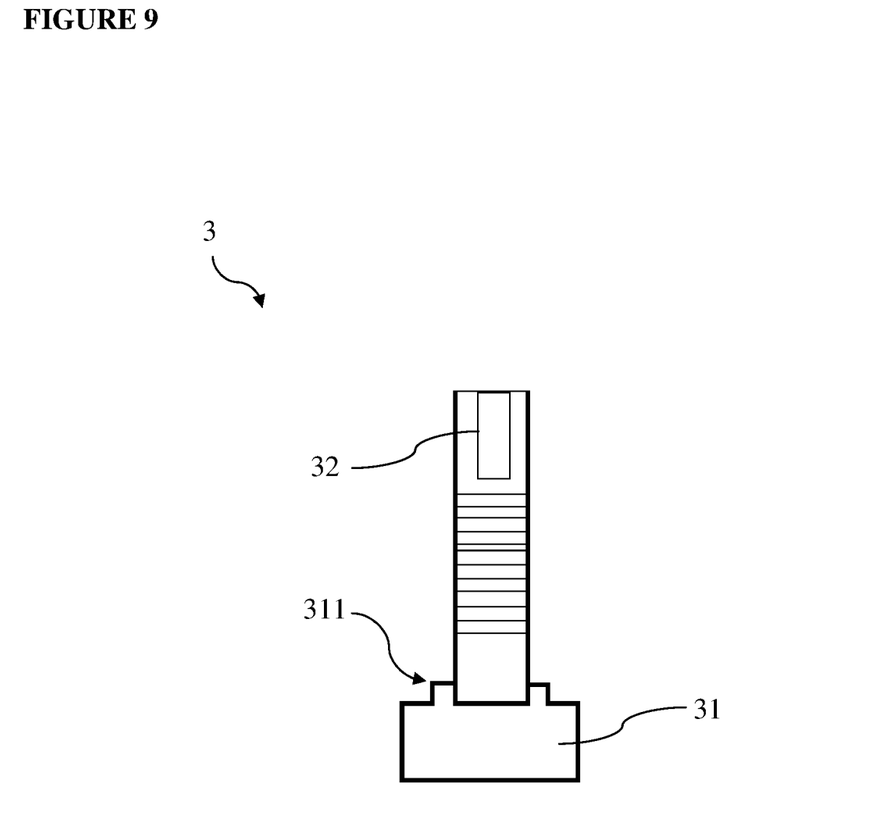
FIG. 9 is the side view of the bolt on the inventive connection system.

In one embodiment of the invention, the washer (5) is in form of a cut ring. There is at least one circular (53) recess on the inner surface of the cut ring shaped washer (5) contacting the head part (31) of the washer (5), and a circular protruding surface (311) on the head part (31) of the bolt in which the recess (53) of the washer (5) will fit. Upon the nut (4) being held fixed and an allen head performing rotary movement by passing into an allen slot (32) or holding the bolt fixed and rotating the nut (4), the head part (31) of the bolt moves towards the hole bushing (2) and applies compression force on the washer (5). The washer (5) performs opening movement in horizontal direction by means of its cut ring shape upon the protruding surface (311) applies force on the washer (5) through the recess (53), and it is enabled that the diameter of the washer (5) reaches greater values than the diameter of the hole bushing (2). Since the washer (5) reaches a greater value than the diameter of the connection hole (I)), it fixes the head part (31) of the bolt on the lower surface (A) of the part (P), and the nut (4) performs locking through the upper surface (B) of the part (P). In this way, the bolt (P) is fixed on the part (P) from its upper surface (B) and its lower surface (A).

In one embodiment of the invention, there is at least one opening recess in form of a channel vertical to the surface of the washer (5), on the outer surface of the cut ring shaped washer (5). The opening recesses enable the washer (5) to open more balanced and proportional with the force of the head part (31).

In one embodiment of the invention, a protruding surface (311) which is used for cut ring shaped washer and in which the washer (5) recess (53) will fit on the head part (31) of the bolt is in form of a helix.

Figure 13:
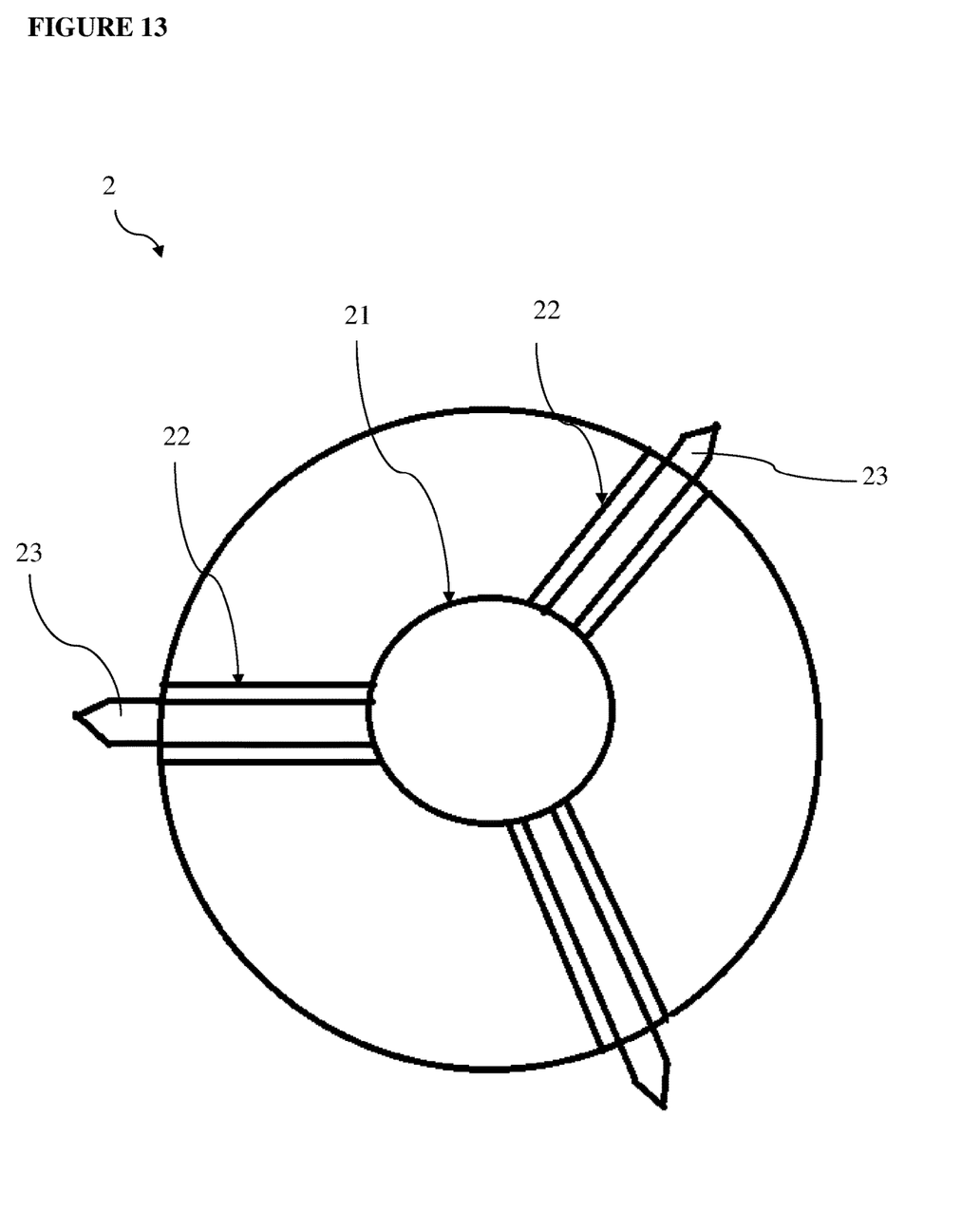
FIG. 13 is the side view of the hole bushing on the inventive connection system.

In one embodiment of the invention, there is at least one horizontal channel (22) which enables the hole bushing (2) to be fixed on the part (P) and which is in form of a hole extending from the screw hole (21) towards inside or outside the part (P), and at least one pin (23) which is used instead of washer (5), which is present inside the horizontal channel (55), and which enables the hole bushing (2) to be fixed on the part (P) by protruding from the horizontal channel (22) towards the lower surface (A) of the part (P) upon the bolt (3) passes through the screw hole (21).

Figure 10:
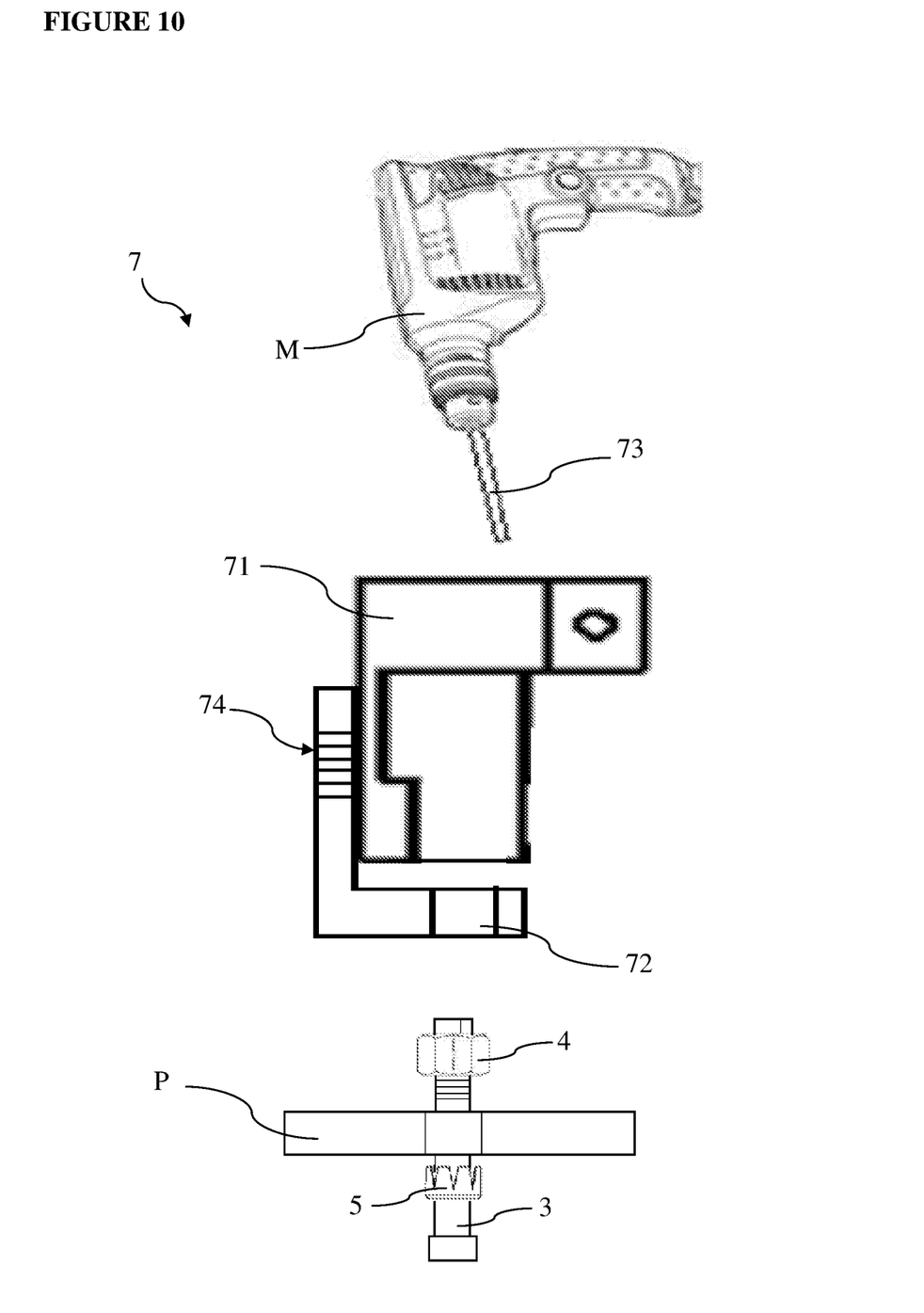
FIG. 10 is the side view of the first turning mechanism on the inventive connection system.

In one embodiment of the invention, it comprises at least one first turning mechanism (7) which holds the nut (4) fixed and which transfers the rotary movement required for the washer (5) to get compressed and open to the bolt (3) with the turning movement of the bolt (3), and comprises at least one primary body (71) which is mounted on a drill (NI) and surrounds the drill (M) bit, at least one primary holder (72) which is aligned with the drill (M) bit on the primary body (71) and prevents the nut (4) inserted therein from turning, at least one allen tip (73) which is placed at the drill (M) bit and the allen slot (32) on the bolt (3), and transfers the rotary movement that it receives from the drill (M) to the bolt (3) through the allen slot (32), at least one primary spring (74) which is connected to the primary body (71) from its one side and to the holder from its other side, and enables the allen tip (73) to move back and forth together with the bolt (3).

The first turning mechanism (7) present in one embodiment of the invention is applied after the bolt (3), nut (4) and the washer (5) are placed on the hole bushing (2), and the hole bushing (2) is placed into the connection hole (I)) on the part (P) which is wanted to be connected. The allen tip (73) attached to the drill bit is inserted into the allen slot (32) present on the bolt (3), and the primary holder (72) present on the primary body (71) connected to the drill prevents the nut (1) from turning. The nut (4) remains fixed upon the drill rotates, and the bolt (3) performs rotary movement and applies pressure on the washer (5).

Figure 11:
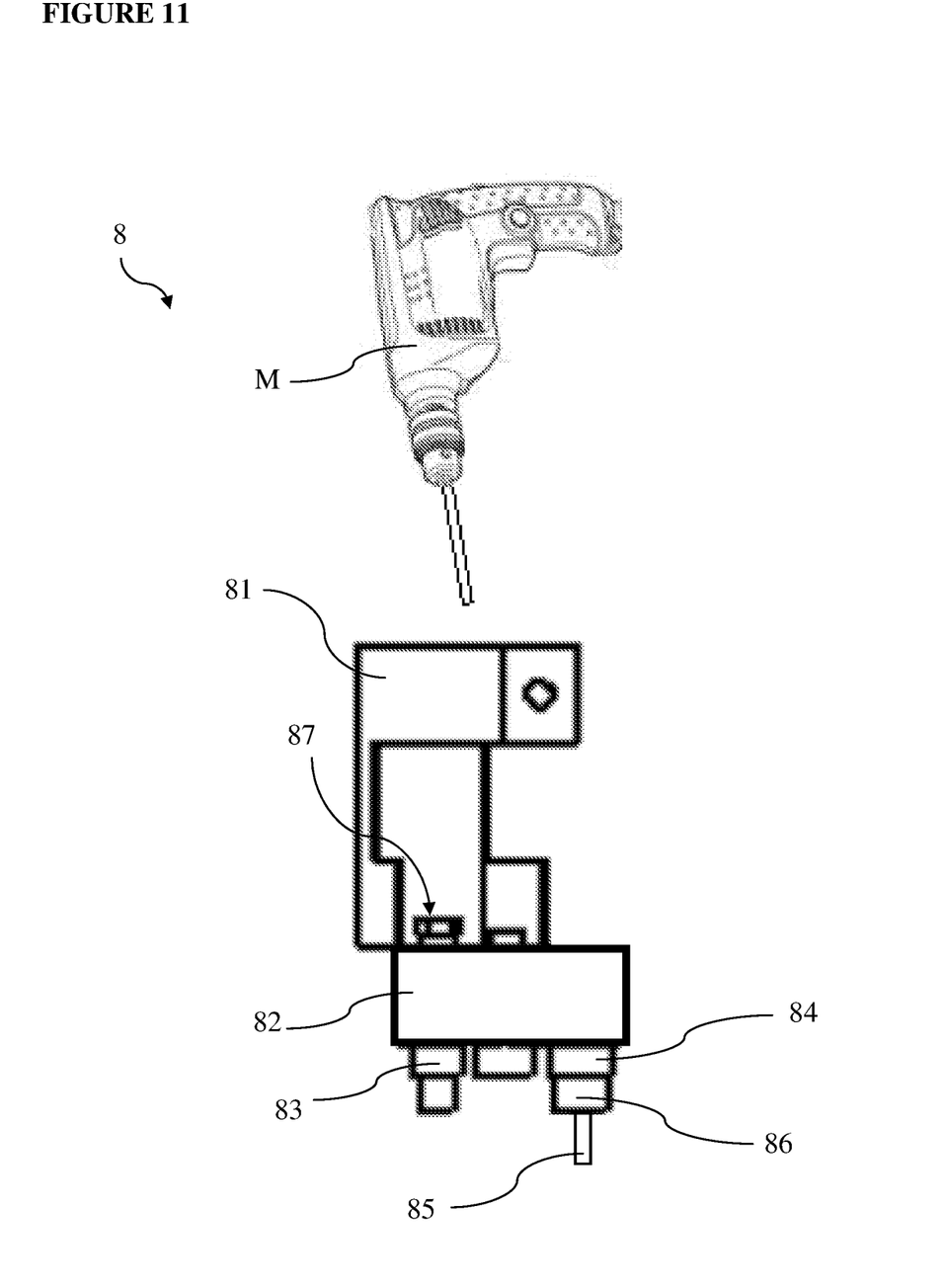
FIG. 11 is the side view of the second turning mechanism on the inventive connection system.
Figure 12:
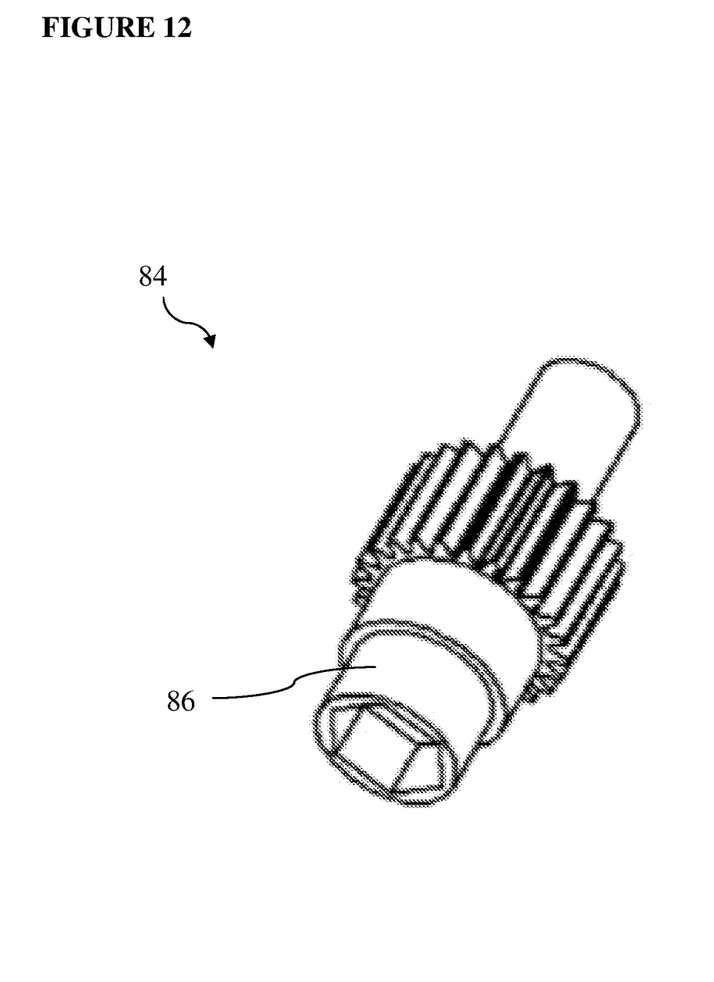
FIG. 12 is the perspective view of the second gear in the first turning mechanism on the inventive connection system.

In one embodiment of the invention, it comprises at least one second turning mechanism (8) which holds the bolt (3) fixed and enables the washer (5) to open with the linear movement of the bolt (3) by means of the turning movement, and which comprises at least one secondary body which is mounted on a drill. (M) and surrounds the drill (M) bit, at least one first gear (83) which is placed on at least one plate (82) present on the secondary body (81) and at least one second gear (84) which performs rotary movement around its own axis with the rotary movement it received from the first gear (83), at least one allen rod (85) which extends over the second gear (84) such that it will engage into the allen slot (32) on the bolt (3) and prevents the bolt (3) from turning by holding onto the allen slot (32), at least one second holder secondary holder (86) which is present on the second gear (84) such that it will grab the nut (l) and transfers the rotary movement of the second gear (84) to the nut (4), at least one secondary head (87) which is connected to the drill (M) bit from its one side and to the first gear (83) from its other side, and transfers the rotary movement it receives from the drill (M) to the first gear (83), at least one secondary spring which is connected to the secondary body (81) from its one side and to the plate (82) from its other side, and enables the holder to move back and forth together with the bolt (3).

The second turning mechanism (8) present in one embodiment of the invention is applied after the bolt (3), nut (4) and the washer (5) are placed on the hole bushing (2), and the hole bushing (2) is placed into the connection hole (D) on the part (P) which is wanted to be connected. The secondary head (87) attached at the tip of the drill transfers the rotary movement it receives from the drill (M) to the first gear (83). The first gear (83) rotating around its own axis on the plate (82) transfers the rotary movement onto the second gear (84). The allen rod (85) fixed on the second gear prevents the bolt (3) from rotating, and the secondary holder (86) rotating together with the second gear (84) also rotates the nut (4) and pulls the bolt (3) towards itself via the screw ribs and enables the head part (31) of the bolt (3) to compress the washer (5).

In one embodiment of the invention, there is a sealing member used for sealing in connection of parts (P) through which fluids pass and on which bolt (3) or nut (4) is placed.

In one embodiment of the invention, the hole bushing (2) has an inclined form compatible with the wall thickness of the inclined connection hole (I)) opening on the pipe shaped parts (P).

In one embodiment of the invention, the washer part is comprised of plastic material.

In one embodiment of the invention, the inside of the bolt (3) has hollow structure from end to end. In case the bolt (3) is used for pipe connection, the fluid passage between the connected pipes is enabled via hole from end to end on the bolt (3).

The said connection system (1) is available for use in many places other than its function here as a hand tool.

What is claimed is:

1. A connection system, which enables two or more parts having a connection hole thereon to be connected or to form a connection on the connection hole on a surface of a first part, comprising:

at least one cylindrical hole bushing passing into the connection hole and the at least one cylindrical hole bushing has at least one screw hole vertical to the surface of the first part, at least one bolt is placed on the at least one cylindrical hole bushing such that a head part of the at least one bolt will remains on a lower surface of the first part or inside the first part, and a size of the head part is equal to or smaller than a diameter of the at least one cylindrical hole bushing, at least one nut attached at a bolt end extending towards outside the first part, the at least one nut fixes the at least one bolt on the at least one cylindrical hole bushing with rotary movement, at least one horizontal channel enables the at least one cylindrical hole bushing to be fixed on the first part, the at least one horizontal channel is in form of a hole extending from the at least one screw hole towards inside or outside the first part, at least one pin is provided inside the at least one horizontal channel, to enable the at least one hole bushing to be fixed on the first part by protruding from the at least one horizontal channel towards the lower surface of the first part upon the at least one bolt passes through the at least one screw hole.

2. The connection system according to claim 1, further comprising a sealing member placed on the at least one bolt or the at least one nut for sealing the two or more parts.

3. The connection system according to claim 1, wherein the at least one hole bushing has an inclined form compatible with a wall thickness of the connection hole on the two or more parts, wherein the two or more parts are pipe shaped parts.

4. The connection system according to claim 1, further comprising a washer comprised of a plastic material.

5. The connection system according to claim 4, further comprising at least one first turning mechanism, the at least one first turning mechanism holds the at least one nut fixed and transfers a rotary movement required for the washer to get compressed and open to the at least one bolt with a turning movement of the at least one bolt, wherein the at least one first turning mechanism, and comprises at least one primary body mounted on a drill and surrounding a drill bit, at least one primary holder aligned with the drill bit on the at least one primary body, the at least primary holder prevents the at least one nut inserted therein from turning, and at least one allen tip is placed at the drill and an allen slot on the at least one bolt, the at least one allen tip transfers the rotary movement received from the drill to the at least one bolt through the allen slot.

6. The connection system according to claim 5, further comprising at least one primary spring connected to the primary body from one side of the at least one primary spring and to the holder from an other side of the at least one primary spring, the at least one primary spring enables the allen tip to move back and forth together with the at least one bolt.

7. The connection system according to claim 4, further comprising at least one second turning mechanism, the at least one second turning mechanism holds the at least one bolt fixed and enables the washer to open with a linear movement of the at least one bolt by means of a turning movement, the at least one second turning mechanism comprises at least one secondary body mounted on a drill and surrounding a drill bit, at least one first gear which is placed on at least one plate present on the secondary body and at least one second gear configured to perform a rotary movement around its own axis with the rotary movement received from the first gear, at least one allen rod extends over the second gear and engaging into the allen slot on the at least one bolt, the at least one allen rod prevents the at least one bolt from turning by holding onto the allen slot, at least one second holder secondary holder is provided on the second gear, the at least one second holder grabs the at least one nut and transfers a rotary movement of the second gear to the at least one nut, at least one secondary head connected to the drill bit from one side and to the first gear from an other side, the at least one secondary head transfers the rotary movement received from the drill to the first gear.

8. The connection system according to claim 7, further comprising at least one secondary spring connected to the secondary body from one side of the at least one secondary spring and to the plate from an other side of the at least one secondary spring, the at least one secondary spring enables the holder to move back and forth together with the bolt.

9. The connection system according to claim 1, wherein, an inside part of the at least one bolt is hollow from end to end enabling a fluid passage between the two or more parts.

10. The connection system according to claim 1, further comprising an allen slot in form of an allen hole at an end of the bolt where the head part is not present.

* * * * *